United States Patent Office 3,616,728
Patented Nov. 2, 1971

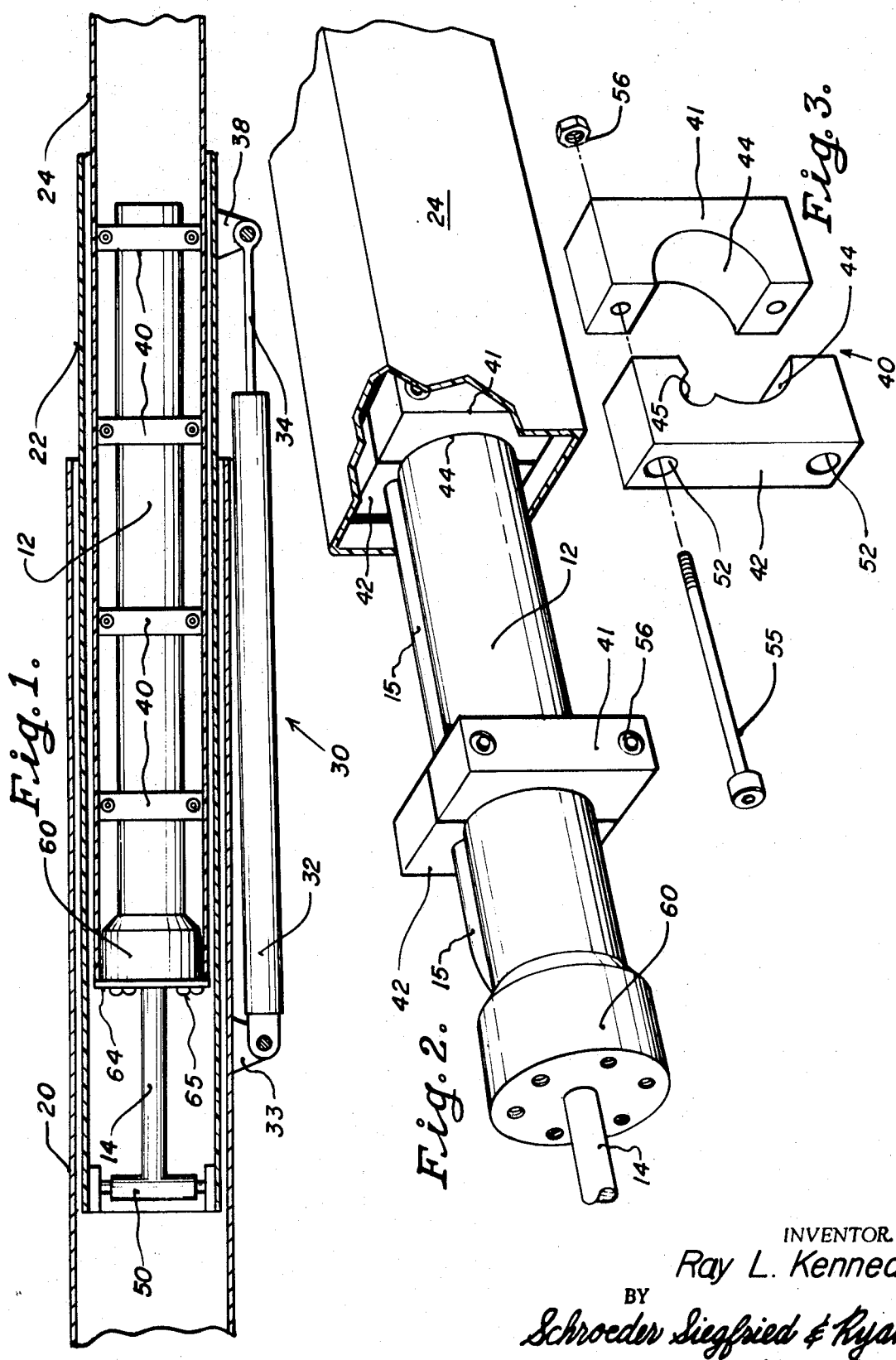

3,616,728
ACTUATOR MOUNTING ASSEMBLY FOR
TELESCOPIC PARTS
Ray L. Kennedy, Excelsior, Minn., assignor to
Tel-E-Lect, Inc., Minneapolis, Minn.
Filed Dec. 5, 1969, Ser. No. 882,412
Int. Cl. F01b 7/20
U.S. Cl. 92—51                                    7 Claims

ABSTRACT OF THE DISCLOSURE

An actuator mounting assembly for telescopic parts in which mounting blocks are positioned around the body of the actuator and at spaced points along the same and rigidly mount the actuator in a telescopic part such that the body of the actuator flexes with the flexure of the telescopic part to maintain alignment of piston and cylinder walls.

---

My invention relates to actuator mounting assemblies for telescopic parts and more particularly for an improved actuator mounting in an articulated boom with a telescopic extension wherein the actuator is positioned within the confines of the extension for slidably actuating the same and is mounted therein to flex with the flexure of the boom extension.

In mobile aerial platforms, telescopic boom structures and the equivalent, it is well recognized that the inner telescopic part may be automatically moved or extended and retracted through the use of a motive device. Such prior structures have incorporated the use of cabling with a location of the actuator at a remote point which arrangement of parts results in a generally complex structure and restricting application of the same where a personnel-carrying platform or bucket is employed at the end of the structure. Where the actuating device is a linear actuator located within the telescopic part, flexure of the telescopic part along its extent has produced cocking of the piston within the cylinder body portion of the linear actuator and shaft bearing wear to impede the operation of the same and cause cylinder leakage problems. Still other mountings have employed a solid fill in the telescopic part enclosing the linear actuator which eliminates the disalignment problems but prevents any removal of the same for repair purposes. The present invention is directed to an improved actuator mounting assembly for telescopic parts, in which a plurality of mounting members are positioned along the extent of the body of the actuator mounting the same within the inner telescopic part in such a manner that any distortion or bending of the part under load will result in a uniform displacement or distortion of the actuator body without resulting in any excessive wear of piston or cylinder or detriment in the operation of the same.

Therefore, it is the principal object of this invention to provide an improved actuator mounting assembly for telescopic parts.

Another object of this invention is to provide an actuator mounting assembly for telescopic parts which is readily installable and removable from the telescopic part to permit removal of the actuator for repair purposes.

Another object of this invention is to provide a structure of this type which is relatively low in cost and easy to maintain.

These and other objects of this invention we can make apparent from reading the attached description together with the drawings wherein:

FIG. 1 is an elevational view of a boom structure with parts broken away to show the positioning of the actuator in telescopic boom parts.

FIG. 2 is a perspective view of the extensible element of the boom structure with parts broken away showing actuator mounting; and FIG. 3 is an exploded perspective view of an individual mounting block;

My improved actuator mounting assembly for telescopic parts is shown in the drawings in connection with a linear actuator being comprised of a conventional cylinder 12 and operating or actuating shaft 14. This actuator may be of the pneumatic or hydraulic type and will normally include a hose connection 15 extending along the extent of the same from one extremity of the actuator which would normally be formed integral with the cylinder casing 12. Suitable hose connections would be attached to either extremity of the cylinder for the purpose of providing pneumatic or fluid power source to the cylinder for bi-directional operation of the same. This type of actuator will include an elongated cylinder whose length dimension would be commensurate with the desired range of movement of telescopic boom parts. Although not shown, it will be understood that the cylinder will include a conventional piston structure attached to the actuating shaft to provide expansible chambers of either side of the piston member for the purpose of causing shaft movement from the actuator.

In the boom structure, it is conventional to employ telescopic parts. Such parts may be cylindrical, polygonal, or rectangular in cross section and for the purpose of the present disclosure it is shown to be the latter. As will be seen in FIG. 1, a conventional boom structure will employ a base or stationary root section such as is indicated at 20 with one or more telescopic parts such as is indicated at 22 and 24 respectively. The base or root section will be connected to some type of platform and be pivotally mounted at its root extremity to be elevated and rotated about a pivot axis for azimuth orientation of the entire structure. The inner telescopic part 22 will normally be extended and retracted through the use of an externally mounted actuator such as is indicated at 30 whose cylinder 32 is attached to the stationary boom structure 20 through a suitable bracket 33 and with the operating shaft 34 connected to the first telescopic part through mechanical connection such as is indicated at 38. The second extensible boom part will normally require an internal mounting for the actuator which will correspond to the actuator 10. This will be mounted internal of the telescopic parts 22, 24 and secured at its shaft and cylinder extremities respectively thereto. Because the telescopic parts flex, it is necessary to provide a mounting structure which will prevent kinking of the cylinder portion of the actuator for improved operation of the same. Thus, it will be seen in FIG. 1, the actuator includes a plurality of mounting blocks 40 positioned along the extent of the cylinder 12 which will have an external dimension in cross section such that they will snugly fit into the interior opening in the hollow boom structure. As indicated in FIG. 1, this mounting of the cylinder will be in the second telescopic part 24, and the operating shaft 14 will be secured through a pivotal connection 50 to the telescopic part 22 with the actuator being so positioned in the telescopic parts 22, 24 and connected thereto as to permit maximum extension of the part 24 relative to the part 22. As will be best seen in FIGS. 2 and 3 the individual mounting blocks 40 are comprised of parts 41, 42 which are generally symmetrical and having a semi-circular recess 44 therein such that when the parts are brought together they will form a cylindrical recess therein. In addition, part 42 includes a secondary recess 45 adapted to snugly fit around the hose or pipe connection 15 found on the actuator. The parts have suitable apertures 52 therethrough through which mounting bolts 55 extend to be secured therein by nuts 56 to secure the block parts 41, 42 in assembled relationship as a complete mounting block 40 around the cylinder and at various spaced portions thereon. These blocks will be positioned on the actuator at varying portions along the cylinder extent of the same and will be fitted into the telescopic boom part for the purpose of mounting the cylinder therein to force the cylinder to follow the deflection of the boom part and will provide for uniform flexure of the cylinder with the flexure of the telescopic boom parts to eliminate distortion and dislocation or cocking of piston within a cylinder to improve actuator operation. Normally, one mounting block or the cylinder extremity will be physically secured to the telescopic part through a rigid connection to mount the cylinder rigidly thereto and prevent relative movement therebetween. In FIG. 1 the cylinder has an enlarged mounting end 60 with the fluid ports therein which is secured to the end of the extensible element through a flange 64 and bolts 65. This improved mounting block assembly permits the cylinder to be readily removed from the boom part in which it is mounted for maintenance purposes and minimizes the adverse effect of flexure on the extended portion of the boom which has the cylinder fixedly connected thereto. Thus, it will provide control of deflection eliminating excessive deflection and wear in the piston area of the cylinder. It further facilitates mounting of the cylinder or actuator within a boom structure.

What is claimed is:

1. An actuator mounting assembly for telescopic parts comprising, a pair of telescopic parts, a fluid actuator having an elongated cylindrical body and an actuating shaft extending therefrom, means connecting the cylindrical body of the actuator to one of the telescopic parts and the free extremity of the shaft to the other of the telescopic parts, said body having a cross section which is less than than the internal cross section of the telescopic parts, a plurality of mounting members positioned around the cylindrical body of the actuator and spaced thereon along the extent of the cylindrical body for mounting the cylindrical body in one of said telescopic parts, said mounting members each having an external peripheral shape conforming to the internal cross section of said one of said telescopic parts to cause said cylindrical body of the actuator when mounted therein to conform thereto with flexing of said one of said telescopic parts.

2. The actuator mounting assembly of claim 1 in which the telescopic parts are tubular and at least the inner telescopic part is made of a fiberglass material.

3. The actuator mounting assembly of claim 1 in which the pair of telescopic parts are a hollow boom member with a hollow slidable extension positioned therein and in which the boom and extension are generally rectangular in cross section, with at least the extension being made of a fiberglass material.

4. The actuator mounting assembly of claim 3 in which the plurality of mounting members are each generally rectangular in form with a cylindrical aperture therein adapted to fit around the cylindrical body of the actuator.

5. The actuator mounting assembly of claim 4 in which the mounting members are each formed in two parts with the parts having a semi-cylindrical recess therein combining to form the cylindrical recess to fit around the body of the fluid actuator, and with apertures through the sides of the parts through which the bolts extend secure the parts in a similar relationship.

6. The actuator mounting assembly of claim 5 in which one of the parts of the mounting member includes an additional recess extending from the surface of the cylindrical recess and adapted to enclose and position hose lines for the fluid actuator.

7. The actuator mounting assembly of claim 1 in which the mounting members are rectangular blocks having dimensions to slidably fit into the inner telescopic part and with a cylindrical recess therein to snugly mount the body of the fluid actuator and in which the blocks are made of a fiberglass material.

References Cited

UNITED STATES PATENTS

| Number | Date | Name | Classification |
|---|---|---|---|
| 3,516,553 | 6/1970 | Reske | 52—118 X |
| 3,273,466 | 9/1966 | Balough et al. | 92—117 |
| 2,664,112 | 12/1953 | Isenberg | 138—113 |
| 1,761,075 | 6/1930 | Gest | 138—112 |
| 1,133,976 | 3/1915 | Kraus | 248—68 |

MARTIN P. SCHWADRON, Primary Examiner

R. H. LAZARUS, Assistant Examiner

U.S. Cl. X.R.

212—55